(12) United States Patent
Roesch

(10) Patent No.: US 10,914,668 B2
(45) Date of Patent: Feb. 9, 2021

(54) SENSOR FOR DETECTING PARTICLES

(71) Applicant: Robert Bosch GmbH, Stuttgart (DE)

(72) Inventor: Sabine Roesch, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 221 days.

(21) Appl. No.: 15/309,435

(22) PCT Filed: Mar. 13, 2015

(86) PCT No.: PCT/EP2015/055267
§ 371 (c)(1),
(2) Date: Nov. 7, 2016

(87) PCT Pub. No.: WO2015/169486
PCT Pub. Date: Nov. 12, 2015

(65) Prior Publication Data
US 2017/0146441 A1    May 25, 2017

(30) Foreign Application Priority Data

May 9, 2014   (DE) .................. 10 2014 208 736

(51) Int. Cl.
*G01N 15/06* (2006.01)
*G01N 15/00* (2006.01)
*F01N 11/00* (2006.01)

(52) U.S. Cl.
CPC ....... *G01N 15/0656* (2013.01); *F01N 11/007* (2013.01); *G01N 15/0606* (2013.01); *F01N 2560/05* (2013.01); *G01N 2015/0046* (2013.01)

(58) Field of Classification Search
CPC .......... G01N 15/0656; G01N 15/0606; G01N 2015/0046; F01N 11/007; F01N 2560/05;
(Continued)

(56) References Cited

U.S. PATENT DOCUMENTS 5,944,536 A * 8/1999 Seong ................ H01R 43/0256
439/328
6,431,882 B1 * 8/2002 Noda .................... H01R 13/658
439/79

(Continued)

FOREIGN PATENT DOCUMENTS

| DE | 102006032741 A1 | 1/2008 |
| DE | 102007046099 A1 | 4/2009 |
| DE | 102013210547 A1 | 7/2014 |

OTHER PUBLICATIONS

Joining, Understanding the Basics, ASM International, 2011, p. 198-199.*

(Continued)

*Primary Examiner* — Eric S. McCall
*Assistant Examiner* — Timothy P Graves
(74) *Attorney, Agent, or Firm* — Norton Rose Fulbright US LLP; Gerard Messina

(57) ABSTRACT

A sensor for detecting particles, in particular soot particles. The sensor comprises at least two measuring electrodes which are situated on a first layer made of an electrically insulating or conductive material, and at least two supply lines for the measuring electrodes. The supply lines are connected to the measuring electrodes respectively in a connection region. The supply lines are covered by at least one second layer made of an electrically insulating material such that the connection region is not covered by the second layer made of an electrically insulating material.

5 Claims, 1 Drawing Sheet

(58) Field of Classification Search
CPC . Y10S 439/951; H01R 12/712; H01R 12/714; H01R 12/732
See application file for complete search history.

(56) References Cited

U.S. PATENT DOCUMENTS

| | | | |
|---|---|---|---|
| 2008/0190173 A1* | 8/2008 | Wienand | G01N 15/0656 73/28.01 |
| 2010/0180668 A1* | 7/2010 | Kruse | G01N 15/0656 73/28.01 |
| 2012/0103057 A1* | 5/2012 | Kimata | G01N 15/0656 73/23.33 |

OTHER PUBLICATIONS

International Search Report, dated May 27, 2015, of the corresponding PCT application PCT/EP2015/055267 filed Mar. 13, 2015.

\* cited by examiner

SENSOR FOR DETECTING PARTICLES

BACKGROUND INFORMATION

Numerous methods and devices for detecting particles, such as soot or dust particles, are available in the related art.

Below, the present invention is described in particular with reference to sensors for detecting particles, especially soot particles, in an exhaust-gas flow of an internal combustion engine, but without thereby restricting additional specific embodiments and applications.

Conventionally, measurements of a particle concentration, e.g., of soot or dust particles, in an exhaust gas is carried out with the aid of two electrodes, which are situated on ceramics. This may be done, for instance, by measuring the electrical resistance of the ceramic material that separates the two electrodes. More precisely, what is measured is the electric current flowing between the electrodes when an electric voltage is applied to them. The soot particles collect between the electrodes as a result of electrostatic forces and, over the course of time, form electrically conductive bridges between the electrodes. The more of these bridges are present, the greater the rise in the measured current. This thus results in an increasing short-circuit of the electrodes.

These types of sensors, for example, are used in an exhaust-gas tract of an internal combustion engine, such as in a diesel combustion engine. Usually, these sensors are situated downstream from the outlet valve or from the soot particle filter.

Despite the numerous advantages of the conventional devices for particle detection, there is room for improvement. For example, the electrodes are normally electrically connected to supply lines produced from a material that includes platinum. The supply lines are coated with a ceramic layer. After a certain period of time, the sensor is regenerated through intrinsic heating and the accumulated soot is combusted. This is achieved by way of an integrated heater. This may result in an undesired collection of moisture in the region of the platinum-containing supply lines.

SUMMARY

An example sensor is provided for detecting particles, especially soot particles, which makes it possible to minimize the accumulation of moisture and which is improved especially with regard to its manufacturability.

A sensor for detecting particles, in particular soot particles, according to the present invention includes at least two measuring electrodes. The two measuring electrodes are situated on a first layer made from an electrically insulating material. In addition, the sensor includes at least two supply lines leading to the measuring electrodes, each measuring electrode being allocated a separate supply line. The supply lines are connected to the measuring electrodes in a separate connection region in each case. This means that, in each instance, a supply line is connected to a separate measuring electrode. The supply lines are covered by at least one second layer, made from an electrically insulating material, such that the second layer of an electrically insulating material leaves the connection region exposed. In other words, the second layer, made of an electrically insulating material, is applied to the supply line in such a way that the second layer does not cover the connection region including the measuring electrodes.

The first layer of an electrically insulating material and/or the second layer of an electrically insulating material may be at least partially produced from a ceramic material. The second layer, made of an electrically insulating material, may completely cover the supply lines, with the exception of the connection region. The connection region may be situated on the first layer of an electrically insulating material. The connection region may be made up of a section of the measuring electrodes and a section of the supply lines. The section of the supply lines may be situated on the first layer of an electrically insulating material and the section of the measuring electrodes may be situated on the section of the supply lines. The supply lines may be at least partially situated on a third layer, which is produced from an electrically insulating or an electrically conductive material. The first layer of an electrically insulating material may be situated on the third layer of an electrically insulating material. The supply lines may be embedded between the second layer of an electrically insulating material and the third layer of an electrically insulating material. The third layer of an electrically insulating material may be produced from a ceramic material.

A particle within the meaning of the present invention refers in particular to electrically conductive particles, such as soot or dust particles.

Measuring electrodes within the scope of the present invention are electrodes that lend themselves to a current-voltage measurement.

A current-voltage measurement within the framework of the present invention relates to a measurement in which either a certain electrical voltage is applied to the measuring electrodes and an electrical current flow between the measuring electrodes is measured, or in which an electric current is applied to the measuring electrodes and an electric voltage between the measuring electrodes is measured. A current-voltage measurement, in particular, may be a resistance measurement, in which a resistance through the measuring electrodes is able to be measured. For example, a voltage-controlled or a voltage-regulated measurement, and/or a current-controlled and/or a current-regulated measurement may be carried out. The application of the current and/or the voltage can take the form of a continuous signal and/or also the form of a pulsed signal. A DC voltage and/or a DC current may be applied, for example, and a current response or a voltage response may be detected. As an alternative, a pulsed voltage and/or a pulsed current could be applied and a current response or a voltage response may be detected.

In the context of the present invention, interdigital electrodes are electrodes that are situated so that they engage with one another, in particular in a comb-like manner.

An electrically insulating material within the scope of the present invention is any material that is suitable to prevent a current flow. In the framework of the present invention, this refers to electrically insulating materials in the form of ceramics, in particular. Especially silicon oxide and/or aluminum oxide and/or zirconium oxide may be employed.

Within the present invention, a layer denotes a uniform mass that has an areal extension with a certain height, which may be situated on, underneath or between other components.

One basic idea of the present invention is not to cover a connection region between the supply lines and the measuring electrodes with a ceramic insulating layer, but to leave it exposed instead. However, in order to prevent an undesired deposition of particles in the region of the supply line, the supply line must be completely covered by a ceramic insulation layer, with the exception of the connection region. The connection region between the supply line and the measuring electrodes is therefore situated in closer proximity to the region of the active electrode surface. Less moisture is therefore able to enter between the ceramic insulating layer and the supply lines.

Another advantage of this design is that there is now no longer any need to overprint a thick platinum structure during the production process, so that, for instance, the occurrence of pin holes, which may result from air inclusions during the overprinting, can be avoided. In addition to the modified design of the measuring electrodes and the supply lines, one further optimization was incorporated into the design of the electrode cell, which is realized by shortening the ceramic layer that is situated underneath the measuring electrode, so that it is also no longer necessary to overprint the previous butt joint. This, too, contributes to the avoidance of process-related difficulties such as the creation of pinholes or tears.

BRIEF DESCRIPTION OF THE DRAWINGS

Further optional details and features of the present invention result from the following description of preferred exemplary embodiments, which are illustrated schematically in the figures.

DETAILED DESCRIPTION OF EXAMPLE EMBODIMENTS

Figure 1:
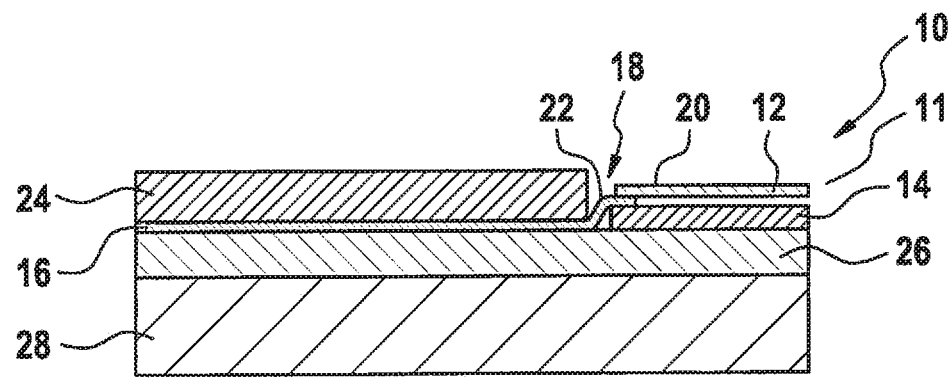
FIG. 1 shows a cross-sectional view along a longitudinal direction of a portion of a sensor for detecting particles according to the present invention.

FIG. 1 shows a cross-sectional view along a longitudinal direction of a portion of a sensor 10 for detecting particles, in particular soot particles in a gas flow such as an exhaust-gas flow of an internal combustion engine, the sensor being intended for an installation in an exhaust-gas tract of a motor vehicle. For instance, sensor 10 is developed as a soot sensor and preferably situated downstream from a soot particle filter of a motor vehicle equipped with a diesel combustion engine. More precisely, FIG. 1 shows a cross-sectional view along a longitudinal axis of a sensor or electrode cell 11 of sensor 10.

Sensor 10 or sensor cell 11 includes two measuring electrodes 12. Measuring electrodes 12 are situated on a first layer 14 produced from an electrically insulating material. As an alternative, first layer 14 could be made from an electrically conductive material, such as a doped material that has low conductivity at higher temperatures. First layer 14, for example, is produced from a ceramic material, such as silicon oxide and/or aluminum oxide and/or zirconium oxide. Measuring electrodes 12 may be situated on first layer 14 of an electrically insulating or an electrically conductive material, in particular in the form of interdigital electrodes. In addition, sensor 10 or electrode cell 11 includes at least two supply lines 16. One supply line 16 in each case is allocated to one of measuring electrodes 12. Supply lines 16 are electrically connected to measuring electrodes 12. A connection region 18 is provided for this purpose. Connection region 18 is formed by a rear section 20 of measuring electrodes 12 and a front section 22 of supply lines 16. Rear section 20 and front section 22 overlap. Connection region 18 denotes the particular region in which supply lines 16 and measuring electrodes 12 are in contact.

Supply lines 16 are covered by at least one second layer 24 made of an electrically insulating material such that connection region 18 is left uncovered by second layer 24 of an electrically insulating material. In other words, second layer 24 of an electrically insulating material completely covers supply lines 16 with the exception of connection region 18. It is explicitly stressed in this context that second layer 24, made from an electrically insulating material, may itself be made up of multiple layers or that multiple second layers 24 of an electrically insulating material may be applied onto supply lines 16 in the described manner. For example, second layer 24 made from an electrically insulating material may be produced from a ceramic material such as silicon oxide and/or aluminum oxide and/or zirconium oxide.

First layer 14 produced from an insulating material is in turn situated on a third layer 26 produced from an electrically insulating material. Third layer 26 of an electrically insulating material, for example, may be produced from a ceramic material such as silicon oxide and/or aluminum oxide and/or zirconium oxide. Located on this third layer 26 of an electrically insulating material are supply lines 16. Supply lines 16 are embedded between second layer 24 of an electrically insulating material and third layer 26 of an electrically insulating material. Third layer 26 made from an electrically insulating material is in turn situated on a carrier substrate 28. Carrier substrate 28 may likewise be produced from an electrically insulating material.

Figure 2:
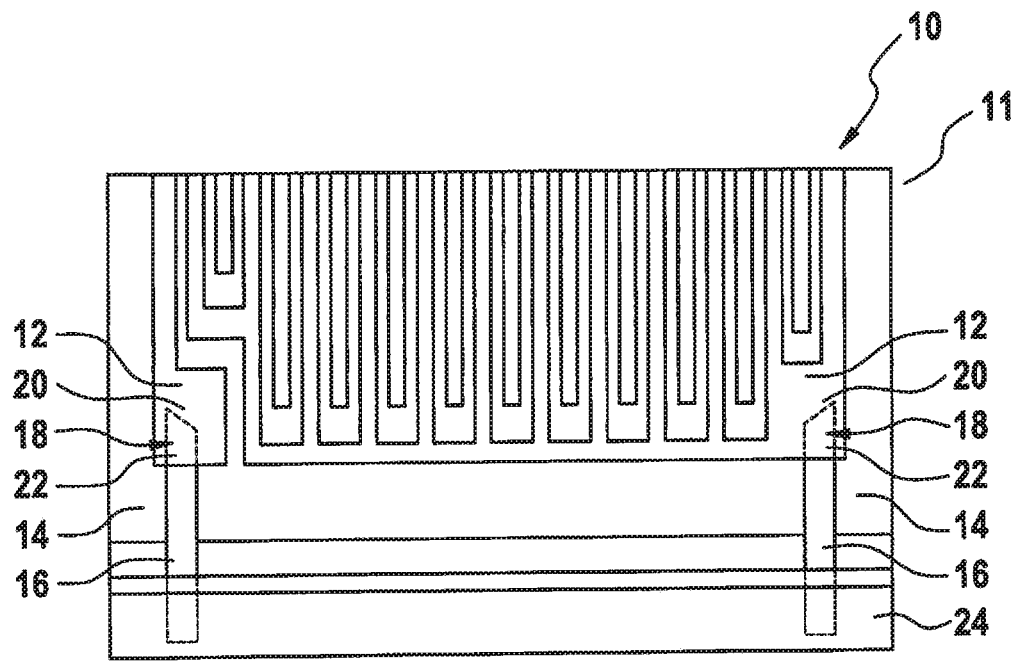
FIG. 2 shows a plan view of a portion of the sensor for detecting particles according to the present invention.

FIG. 2 shows a plan view of a portion of sensor 10. More precisely, FIG. 2 shows a plan view of electrode cell 11 of sensor 10. Depicted are the two measuring electrodes 12, front sections 22 of supply lines 16, which are situated on first layer 14 of an electrically insulating or conductive material, and connection region 18. It is furthermore apparent that second layer 24 of an electrically insulating material is not located in connection region 18. In addition, it is clear that measuring electrodes 12 are situated on front section 22 of supply lines 16 with their rear section 20. A design of this type can be produced by printing third layer 26 of an electrically insulating material onto carrier substrate 28. Subsequently, first layer 14 of an electrically insulating or conductive material is printed onto third layer 26 of an electrically insulating material. Supply lines 16 are finally printed onto third layer 26 of an electrically insulating material in such a way that their front section 22 is situated on first layer 14 of an electrically insulating or conductive material. Measuring electrodes 12 are then printed onto first layer 14 of an electrically insulating or conductive material in such a way that their rear section 20 is applied on front section 22 of supply lines 16. Second layer 24 of an electrically insulating material is subsequently printed onto supply lines 16 in such a way that connection region 18 remains free. The printing of the individual components of sensor 10 may be carried out in a conventional manner, using pastes, such as in the screen-printing method.

In particular from FIG. 1, it is apparent that by not covering connection region 18 with second layer 24 of an electrically insulating material, less moisture is able to penetrate between supply lines 16 and second layer 24 of an electrically insulating material.

What is claimed is:

1. A sensor for detecting soot particles, comprising:
   at least two measuring electrodes situated on a first layer of an electrically insulating or conductive material;
   at least two supply lines leading to the measuring electrodes, the supply lines being connected to the measuring electrodes in a connection region in each case, and the supply lines being covered by at least one second layer made of an electrically insulating material in such a way that the connection region is left uncovered by the second layer made of an electrically insulating material,
wherein the connection region is formed by a rear section of the measuring electrodes and a front section of the supply lines, wherein the rear section and front section at least partially overlap,
wherein the supply lines are completely covered by the second layer with the exception of the connection region,
wherein the supply lines are embedded between the second layer and a third layer of an electrically insulating material, wherein the third layer is situated on a carrier substrate of an electrically insulating material,
wherein the connection region is formed by a section of the measuring electrodes and a section of the supply lines,
wherein the section of the supply lines is situated on the first layer, and the section of the measuring electrodes is situated on the section of the supply lines.

2. The sensor as recited in claim 1, wherein at least one of the first layer and the second later is at least partially made from a ceramic material.

3. The sensor as recited in claim 1, wherein the connection region is situated on the first layer.

4. The sensor as recited in claim 1, wherein the supply lines are at least partially situated on the third layer of an electrically insulating material.

5. The sensor as recited in claim 4, wherein the first layer is made of an electrically insulating material is situated on the third layer.

* * * * *